No. 644,823. Patented Mar. 6, 1900.
G. HEIDEL.
ELECTRIC LAMP FOR BICYCLES.
(Application filed Jan. 9, 1899.)
(No Model.)
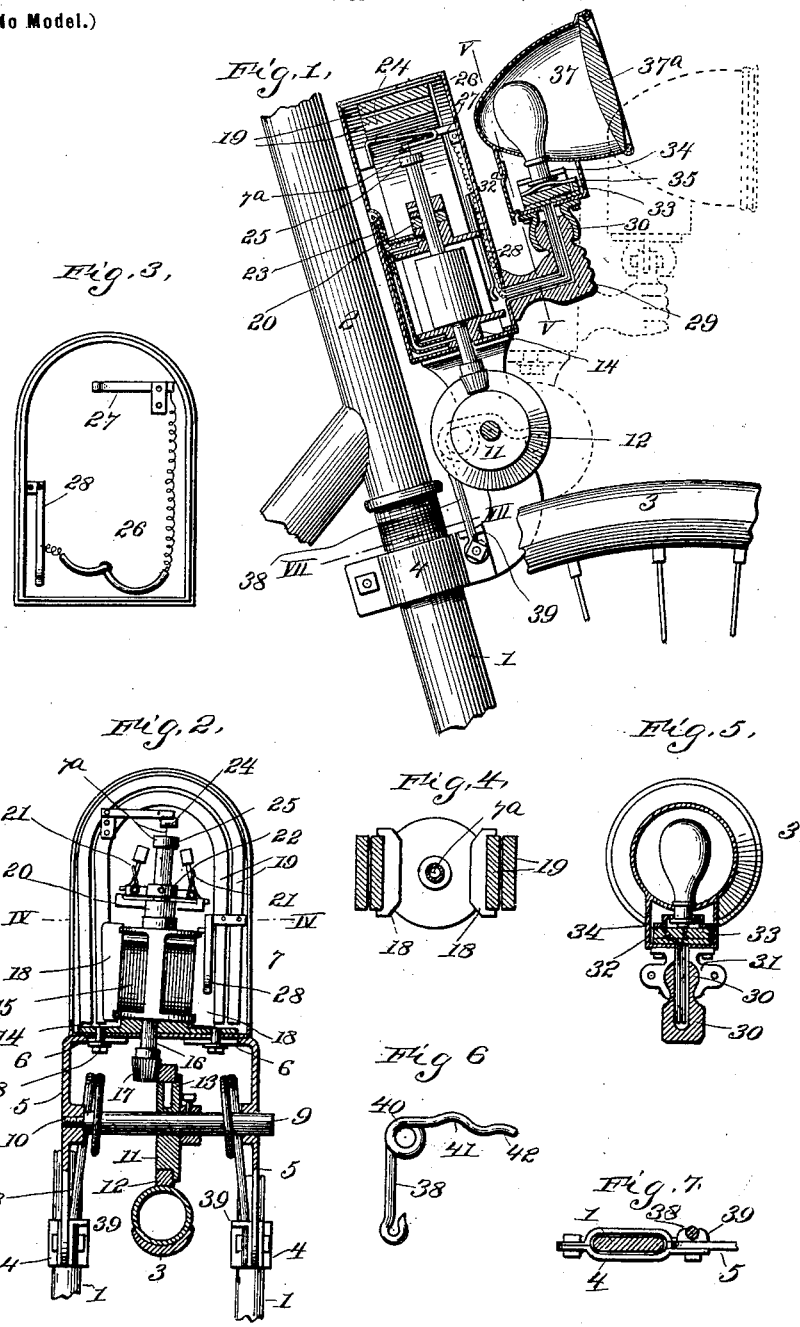
Witnesses:
E. K. Allen.
Katherine E. Manning.
Inventor:
Gustavos Heidel,
By Knight Bros
Attys.

UNITED STATES PATENT OFFICE.

GUSTAVOS HEIDEL, OF ST. LOUIS, MISSOURI, ASSIGNOR TO THE GLOBE ELECTRIC COMPANY, OF SAME PLACE.

ELECTRIC LAMP FOR BICYCLES.

SPECIFICATION forming part of Letters Patent No. 644,823, dated March 6, 1900.

Application filed January 9, 1899. Serial No. 701,556. (No model.)

*To all whom it may concern:*

Be it known that I, GUSTAVOS HEIDEL, a citizen of the United States, residing at the city of St. Louis, in the State of Missouri, have invented certain new and useful Improvements in Electric Lamps for Bicycles, of which the following is a full, clear, and exact description, reference being had to the accompanying drawings, forming part of this specification.

My invention relates to electric lamps for use upon bicycles and wherein a current of electricity is generated by power derived from the steering-wheel of the bicycle to furnish the current supplied to the filament of the lamp.

My invention consists in features of novelty hereinafter fully described, and pointed out in the claims.

Figure I is a view showing a fragment of the frame of a bicycle and steering-wheel with my lamp applied thereto, illustrated partly in elevation and partly in vertical section. Fig. II is a vertical sectional view through the operating mechanism of the lamp, a portion of the same being shown in elevation. Fig. III is an inner face view of the front plate of the lamp-casing. Fig IV is a sectional view taken on line IV IV, Fig. II. Fig. V is a detail sectional view of the lamp-bulb and its support, taken on line V V, Fig. I. Fig. VI is a detail view of one of the retaining-springs by which the lamp-carrying frame is supported in varying positions. Fig. VII is a detail view of one of the attachment-clips to which the lamp-supporting frame is attached, the said view being taken on section-line VII VII, Fig. I.

1 designates the fork of the frame 2 of a bicycle, and 3 is the bicycle steering-wheel, mounted in the fork, as usual.

4 designates clips bolted or otherwise suitably secured to the arms of the fork 1.

5 are the arms of a supporting-frame, which are pivotally connected to the clips 4 by one of the attaching-bolts thereof, so that the said arms may be rocked with relation to the said clips. The opposite ends of the arms 5 are provided with inturned slotted portions 6, on which the casing 7 of the lamp mechanism is mounted, the casing being attached to the arms by screws or bolts 8, fitting in the slotted portions 6 and passing through the casing.

9 designates a shaft, one end of which is loosely mounted in one of the frame-arms 5, while the opposite end is fixed to the other arm 5 by a screw-threaded end 10 (see Fig. II) or other suitable means. By means of this construction the frame-arms 5 may be applied to bicycle-forks of varying width, inasmuch as the slotted portions 6 of the said arms allow for the inward and outward adjustment of the arms with relation to the casing 7, and the shaft 9, having one of its ends loosely seated, is capable of slipping in the frame-arm in which it is mounted when the width of the frame is altered.

11 designates a wheel loosely mounted on the shaft 9. This wheel is provided with an elastic frictional rim 12, preferably rubber, having a tapering side face. The rim of this wheel is designed to be thrown into contact with the tire of the bicycle steering-wheel 3. In the friction-wheel 11 is an oil-pocket 13, provided with an inlet-aperture and having a duct leading to the shaft 9 to supply oil to the bearing of the wheel on the shaft. The oil-pocket is preferably supplied with an absorbent filling, such as wicking.

14 designates a frame located within the casing 7, into which the screws or bolts pass.

15 designates an armature mounted within the frame 14, and 16 is the shaft, extending above the armature and also downwardly through the casing 7 into proximity with the wheel 12, where it is provided with a corrugated friction-cone 17, that is adapted to bear in frictional contact with the coincident tapering side of the elastic rim 12, carried by said wheel. It will therefore be seen that when motion is imparted to the wheel 11 by reason of its frictional contact with the steering-wheel of the bicycle the motion is transmitted through the rim of said wheel to the friction-cone 17 to operate the armature-shaft 16.

Disposed at opposite positions against the frame 14 are field-pieces 18, that are loosely seated against said frame and are confined thereto by horseshoe-magnets 19, the ends of which fit over the inclined outer faces of the field-pieces and clamp them to the frame 14, dispensing with any other means for securing said field-pieces in position.

The armature 15 and its shaft 16 are loosely mounted in the frame 14, so as to be capable of endwise or vertical movement therein, and on the armature-shaft, above the frame 14, is a collar 20, loosely mounted on the shaft, but so held thereto as to partake of rotation with the shaft. The collar 20 is provided with notched arms that receive the legs of governor-wings 21, mounted in the arms of the collar 22, fixed to the armature-shaft. The governor-wings are preferably provided with suitable controlling-springs. By the use of these features of construction I am enabled to reduce the necessary friction between the friction-cone 17 and the rim of the friction-wheel 11 to a minimum, inasmuch as when the speed of the armature-shaft reaches a considerable velocity the governor-wings 21 are thrown outwardly by centrifugal action, and their legs bearing against the arms of the collar 20 cause the armature-shaft to be raised through said collar, lifting the armature and the friction-cone, so that the frictional contact between the cone 17 and rim 12 of the friction-wheel is greatly reduced, while at the same time sufficient frictional action is retained to operate the armature to the necessary extent and generate the requisite amount of electric current without danger of maintaining too great a current and burning out the lamp.

23 designates oil-ducts, by which a supply of lubricant may be conducted to the bearings of the armature-shaft. These ducts are preferably supplied with an absorbent filling, such as wicking.

24 designates a contact-arm secured to the casing 7 and resting upon a conducting-wire 7$^a$, extending through the armature-shaft to the armature, but insulated from the shaft by insulation.

25 is an insulator-tip on the upper end of the armature-shaft surrounding the conductor-wire 7$^a$, provided for the purpose of insulating the contact-arm 24 from the armature-shaft to avoid short-circuiting to the said shaft.

26 designates the front plate of the casing 7, which is equipped with the contact-point 27, that bears against the contact 24, and also with the contact 28, that bears against one of the field-pieces 18.

29 designates a bracket carried by the casing-plate 26, having a conduit therethrough, through which positive and negative wires pass from the contacts 27 and 28. The bracket 29 is provided with a socket-piece 30, on which is fitted a socket 31 to form a universal joint. Mounted on the socket 31 is a box 32, that contains an insulator-plate 33, surmounted by a slotted socket 34. Within the socket 34 is a contact-spring 35, that receives the impact of the ring of a lamp-bulb 36 when inserted within said socket. Carried by the box 32 is a reflector-hood 37, that receives the lamp-bulb 36.

The universal joint formed by the socket-piece 30 and socket 31 renders it possible to turn the reflector-hood 37 into varying positions with respect to the remainder of the lamp, and thereby the light from the bulb 36 may be thrown in any desired direction relative to the support by which the lamp is carried.

The back of the box 32 is provided with a doorway that is closed by a door 32$^a$, located at the socket in which the lamp-bulb 36 is held. The reflector-hood is provided with a lens 37$^a$, that is removably seated therein, so that it may be readily extracted and access obtained to the interior of the hood for the purpose of inserting or removing the lamp-bulb, the neck of which is placed through an aperture in the hood into the box 32, and the door 32$^a$ being opened permits the insertion of a person's fingers to press the neck of the bulb into the socket 34 onto the contact-spring 35.

38 designates retainer-springs connected to the bolts that secure the frame-arms 5 to the clips 4, these springs being seated in notched lips 39, carried by the clips 4, so that they are held firmly to the clips. The retainer-springs are provided with coils 40, and their free ends contain offsets 41 and 42. (See Fig. VI.) The free ends of these springs extend over the shaft 9 and bear thereon, and when the lamp is in the elevated position seen in Fig. I the shaft 9 is engaged by the springs 38, with the offset 41 fitting to the shaft and holding the frame of the lamp in elevated position away from the frame of the bicycle, so that the entire lamp is held away from the bicycle-frame and does not knock thereagainst to the injury of the finish of the frame or to cause a disagreeable rattle. When the lamp is thrown forward and the friction-wheel 11 is brought into contact with the periphery of the steering-wheel 3, the shaft 9 is engaged by the springs 38 at the location of the offset 42, thereby steadying the lamp and holding the friction-wheel with an even pressure to the periphery of the steering-wheel.

While I have shown and described the entire lamp as mounted upon the front fork of a bicycle, it is obvious that without departing from my invention the lamp-frame and mechanism may be mounted on the rear fork, so that the friction-roller 11 will bear upon the bicycle drive-wheel and the bracket 29 be supported at the front of the bicycle, with the electric conductor-wires leading from the generating mechanism to the bracket 29 to supply the electrical current to the lamp-bulb in the same manner as where the parts are assembled directly together, as shown in the drawings.

I claim as my invention—

1. In an electric lamp for bicycles, a supporting-frame, a revoluble friction-wheel mounted in said frame having an elastic rim formed with a beveled lateral face and a peripheral face, the latter, adapted to bear against a wheel of the bicycle, an armature, and armature-shaft, a friction-cone carried by said shaft adapted to bear against the beveled lateral face of the elastic rim of said friction-wheel, a lamp-bulb, and conductors leading from said armature to said lamp-bulb, substantially as described.

2. In an electric lamp for bicycles, clips applied to the bicycle, notched lips on said clips, a supporting-frame pivoted to said clips, a friction-wheel mounted on a shaft carried by said frame and adapted to bear against a wheel of the bicycle, electrical generating mechanism driven by said friction-wheel, springs secured to said clips and fitting in said notched lips, said springs being provided with arms containing offsets adapted to engage said shaft, substantially as described.

3. In an electric lamp for bicycles, a supporting-frame, a revoluble friction-wheel mounted in said frame, said wheel having a beveled elastic rim having a peripheral face adapted to bear against a wheel of the bicycle and a beveled lateral face, an armature, an armature-shaft, a friction-cone carried by said shaft adapted to bear against the beveled lateral face of said friction-wheel rim, a governor adapted to control the movement of said armature-shaft whereby the contact between said friction-cone and beveled elastic rim is regulated; substantially as described.

GUSTAVOS HEIDEL.

In presence of—
E. S. KNIGHT,
STANLEY STONER.